US012782870B2

(12) United States Patent
Miskin et al.

(10) Patent No.: US 12,782,870 B2
(45) Date of Patent: Nov. 3, 2026

(54) ELECTRONICALLY CONTROLLED MICROSCALE OPTICAL RESONATOR USING CONDUCTIVE AQUEOUS SOLUTION

(71) Applicant: THE TRUSTEES OF THE UNIVERSITY OF PENNSYLVANIA, Philadelphia, PA (US)

(72) Inventors: Marc Miskin, Media, PA (US); David Gonzalez-Medrano, Virginia Beach, VA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 323 days.

(21) Appl. No.: 18/596,876

(22) Filed: Mar. 6, 2024

(65) Prior Publication Data

US 2024/0302792 A1 Sep. 12, 2024

Related U.S. Application Data

(60) Provisional application No. 63/450,117, filed on Mar. 6, 2023.

(51) Int. Cl.
*G02B 5/28* (2006.01)
*G02B 26/00* (2006.01)
(Continued)

(52) U.S. Cl.
CPC ......... *G03H 1/0808* (2013.01); *G02B 26/001* (2013.01); *G02B 26/004* (2013.01);
(Continued)

(58) Field of Classification Search
CPC ........ G02B 5/284; G02B 5/286; G02B 5/288; G02B 26/001; G02B 26/004; G02B 26/007; G03H 1/0005; G03H 2001/0088; G03H 2001/0216; G03H 2001/0224; G03H 2001/0228; G03H 2001/0232; G03H 1/0808; G03H 1/2294; G03H 2223/15; G03H 2223/24; G03H 2225/35; G09G 3/3258; G09G 2300/0456
See application file for complete search history.

(56) References Cited

U.S. PATENT DOCUMENTS

| | | | | |
|---|---|---|---|---|
| 2009/0002804 A1* | 1/2009 | Natarajan | B81C 1/0092 | 359/291 |
| 2012/0044563 A1* | 2/2012 | Cummings | G02B 26/001 | 359/290 |
| 2013/0135705 A1* | 5/2013 | Hong | G02B 26/001 | 359/290 |

FOREIGN PATENT DOCUMENTS

WO WO 2021/178978 A1 9/2021

OTHER PUBLICATIONS

Miskin et al., "Electronically integrated, mass-manufactured, microscopic robots," Nature 584:557-561 (2020).

* cited by examiner

*Primary Examiner* — Ryan S Dunning
(74) *Attorney, Agent, or Firm* — Baker Botts L.L.P.

(57) ABSTRACT

The presently disclosed subject matter relates to devices and methods for reflective and holographic displays. In particular, the presently disclosed subject matter provides a device comprising a first layer, a second layer for reflecting light, and at least one metal disposed on the second layer. The first layer can include a partially reflective membrane and can be coupled to the at least one metal. The first layer and the second layer can be separated by a gap ranging from about 10 nm to about 1000 nm in size.

20 Claims, 12 Drawing Sheets
(8 of 12 Drawing Sheet(s) Filed in Color)

106

(51) Int. Cl.

| | |
|---|---|
| ***G03H 1/00*** | (2006.01) |
| ***G03H 1/02*** | (2006.01) |
| ***G03H 1/08*** | (2006.01) |
| ***G03H 1/22*** | (2006.01) |
| ***G09G 3/3258*** | (2016.01) |

(52) U.S. Cl.

CPC ......... *G02B 26/007* (2013.01); *G03H 1/0005* (2013.01); *G09G 3/3258* (2013.01); *G02B 5/284* (2013.01); *G02B 5/286* (2013.01); *G02B 5/288* (2013.01); *G03H 2001/0088* (2013.01); *G03H 2001/0216* (2013.01); *G03H 2001/0224* (2013.01); *G03H 2001/0228* (2013.01); *G03H 2001/0232* (2013.01); *G03H 1/2294* (2013.01); *G03H 2223/15* (2013.01); *G03H 2223/24* (2013.01); *G03H 2225/35* (2013.01); *G09G 2300/0456* (2013.01)

ELECTRONICALLY CONTROLLED MICROSCALE OPTICAL RESONATOR USING CONDUCTIVE AQUEOUS SOLUTION

CROSS-REFERENCE TO RELATED APPLICATION

This application claims priority to U.S. Provisional Patent Application No. 63/450,117, which was filed on Mar. 6, 2023, the entire contents of which are incorporated by reference herein.

BACKGROUND

Arrays of small, electronically controlled, microscale optical elements can offer ways to manipulate light more than what is possible with passive, macroscale optics. Examples of such devices include liquid crystal on silicon (LCOS) spatial light modulators, digital micromirror displays, arrays of deformable microelectromechanical mirrors or microelectromechanical-based adjustable filter arrays. In each case, light can reflect from an array of microscopic optical components. These components can be reconfigured on command, enabling complex spatiotemporal light patterns. Useful applications of these technologies include reflective displays, laser scanning systems, adaptive optics, or computer-generated holography.

However, it can be challenging to offer micron-scale pixels, video rate switching speed, and control of the amplitude, phase and spectral properties of the reflected light. Instead, such reflective technologies can accomplish only a subset of these tasks. For instance, while digital micromirror displays can be fast, switching at kilohertz speeds or greater, and offer outstanding amplitude control, there can be challenges to shrinking each pixel under 10 microns in size, and the pixels can strictly switch between two binary states of reflectance with no control of phase or spectral response. This is in contrast to liquid crystal spatial light modulators, which can offer continuous control of the phase of reflected light but are significantly slower and cannot directly control the amplitude or spectral reflectivity. MEMs-based arrays of optical filters have demonstrated continuous control of spectral reflectivity, but with pixels on the scale of 100 microns.

Therefore, there is a need for improved techniques for displays capable of generating arbitrary color spectrums, displays that work by reflecting light as opposed to emitting it (leading to notable power savings when operating in daylight conditions) and/or holographic displays, which have limited viewing angles due to their pixel sizes.

SUMMARY

The presently disclosed subject matter provides devices and methods for reflective and holographic displays.

In certain embodiments, the disclosed subject matter provides a device including a first layer, a second layer for reflecting light, and at least one metal deposited on the second layer. The first layer can be coupled to the metal. The first layer and the second layer can be separated by a gap ranging from about 10 nm to about 1,000 nm in size. The first layer includes a partially reflective membrane.

In certain embodiments, the partially reflective membrane can include a film of platinum, a film of titanium, or a combination thereof. The thickness of the film of platinum or the film of titanium can range from about 1 nm to about 10 nm. The partially reflective membrane can be configured so that a predetermined fraction of light is passed when light strikes the surface of the first layer.

In certain embodiments, the first layer can be configured to be electrically actuated by applying voltage. Edges of the first layer can be clamped for buckling the first layer. The height of the buckled layer can be configured to be tuned by adjusting the applied voltage.

In certain embodiments, the second layer can include aluminum, silicon, glass, gold, rhodium, silver, silicon dioxide, silicon nitride, aluminum oxide, or a combination thereof. The thickness of the second layer can range from about 100 nm to about 1000 nm.

In certain embodiments, the gap can be filled with water. The thickness of the gap can range from about 10 nm to about 1000 nm.

In certain embodiments, the device can be configured to reflect light at predetermined wavelengths. The predetermined wavelengths can be determined by the thickness of the gap. In non-limiting embodiments, the device can be in the form of a pixel. The size of the pixel can range from about 1 micron to about 100 microns.

The disclosed subject matter also provides methods comprising transmitting light through a first layer, reflecting the light using a second layer, resonating the light in the gap, and outputting the light at a predetermined wavelength. The first layer can include a partially reflective membrane. The first layer and the second layer can be separated by a gap ranging from about 10 nm to about 1000 nm in size.

In certain embodiments, the method can further include tuning the amplitude and phase of the light by tuning the size of the gap.

In certain embodiments, the size of the gap can be tuned by electronically actuating the first layer. In non-limiting embodiments, the method can include adjusting the thickness of the first layer. The thickness of the first layer can range from about 1 nm to about 10 nm.

In certain embodiments, the method can include forming at least one pixel using the first layer and the second layer.

The disclosed subject matter will be further described below, with reference to example embodiments shown in the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1B:
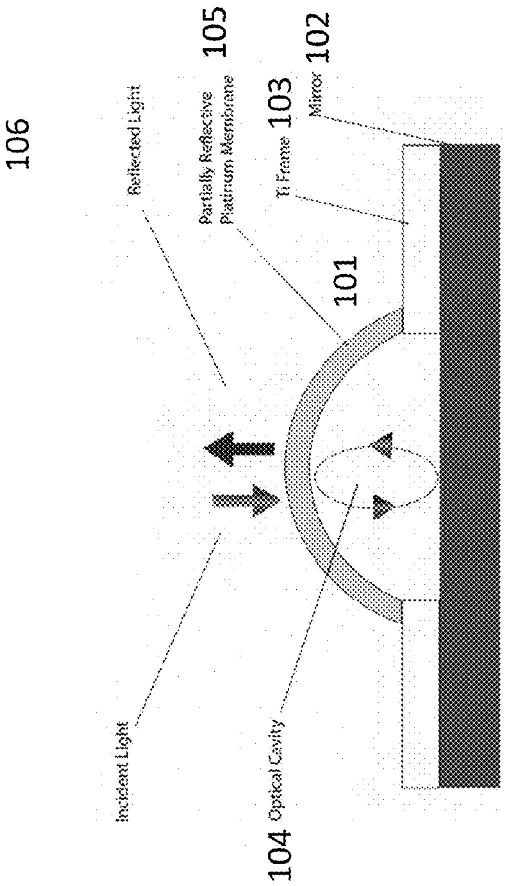
FIGS. 1A-1B show schematic cross-sections of the disclosed tunable optical resonators in accordance with the disclosed subject matter.

The accompanying drawings, which are incorporated and constitute part of this disclosure, illustrate certain embodiments and serve to explain the principles of the disclosed subject matter.

DETAILED DESCRIPTION

The presently disclosed subject matter provides devices and methods for reflective and holographic displays. For example, the disclosed subject matter provides electronically controlled microscale optical resonators 106 for reflective and holographic displays. The disclosed devices can allow a user to tailor a series of optical cavities to reflect only specific wavelengths of light under electronic control.

Unless otherwise defined, all technical and scientific terms used herein have the same meaning as commonly understood by one of ordinary skill in the art. In case of conflict, the present document, including definitions, will control.

As used herein, the use of the word "a" or "an" when used in conjunction with the term "comprising" in the claims and/or the specification can mean "one," but it is also consistent with the meaning of "one or more," "at least one," and "one or more than one." Still further, the terms "having," "including," "containing," and "comprising" are interchangeable, and one of the skills in the art is cognizant that these terms are open-ended terms.

As used herein, the term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, up to 10%, up to 5%, and up to 1% of a given value. Alternatively, e.g., with respect to biological systems or processes, the term can mean within an order of magnitude, within 5-fold, and within 2-fold, of a value.

The terms "comprise(s)," "include(s)," "having," "has," "can," "contain(s)," and variants thereof, as used herein, are intended to be open-ended transitional phrases, terms, or words that do not preclude additional acts or structures. The singular forms "a," "an," and "the" include plural references unless the context clearly dictates otherwise. The present disclosure also contemplates other embodiments "comprising," "consisting of," and "consisting essentially of," the embodiments or elements presented herein, whether explicitly set forth or not.

The term "coupled," as used herein, refers to the connection of a device component to another device component by methods known in the art. The term "coupled," as used herein, can include direct contact (e.g., mechanical contact) or indirect coupling.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. Ranges disclosed herein, for example, "between about X and about Y" are, unless specified otherwise, inclusive of range limits about X and about Y as well as X and Y. With respect to sub-ranges, "nested sub-ranges" that extend from either endpoint of the range are specifically contemplated. For example, a nested sub-range of an exemplary range of 1 to 50 can include 1 to 10, 1 to 20, 1 to 30, and 1 to 40 in one direction, or 50 to 40, 50 to 30, 50 to 20, and 50 to 10 in the other direction. Ranges disclosed herein, for example, "between about X and about Y" are, unless specified otherwise, inclusive of range limits about X and about Y as well as X and Y.

Figure 1A:
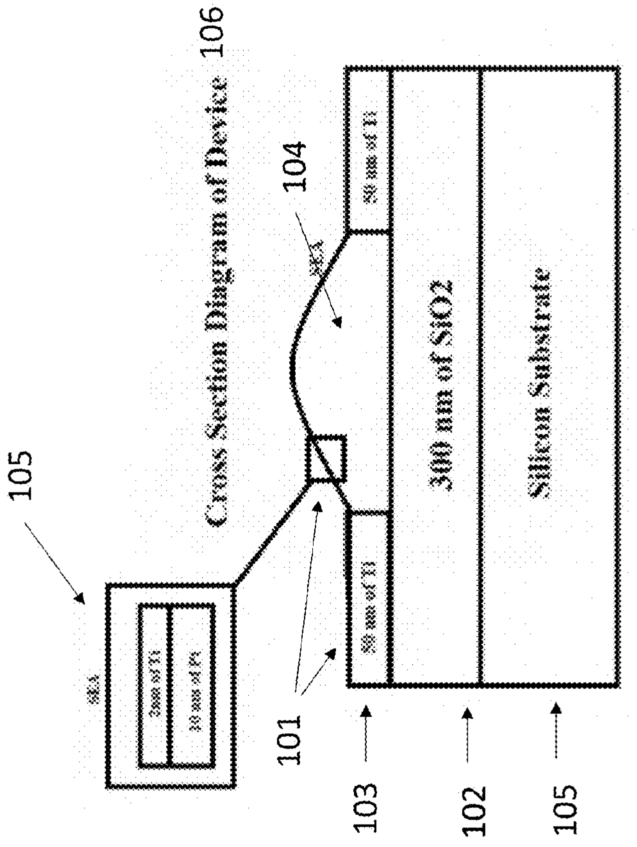

In certain embodiments, the disclosed subject matter provides a device for reflective and holographic displays. An example device can include a first layer 101 and a second layer 102. In non-limiting embodiments, the first layer 101 and the second layer 102 can be coupled through at least one metal 103. For example, as shown in FIGS. 1A and 1B, the metal 103 can be disposed on the second layer 102, and the first layer 101 can be connected to the metal 103 forming a gap (e.g., cavity 104) between the first layer 101 and second layer 102.

In certain embodiments, the first layer 101 can include a partially reflective membrane 105. The partially reflective membrane 105 can be configured to a predetermined fraction of light that is passed when light strikes the surface of the first layer 101. The remainder of the light can be reflected and absorbed by the material. For example, when light strikes the surface of the first layer 101 (from top or bottom), the first layer 101 can reflect only a predetermined fraction of the light while the rest is transmitted therethrough.

In non-limiting embodiments, the first layer 101 can include platinum, titanium, or a combination thereof. For example, the first layer 101 includes platinum and further includes any other suitably thin second layer 102 including, but not limited to, gold, silicon dioxide, titanium dioxide, rhodium, iridium, and palladium. In non-limiting embodiments, the first layer 101 can include more than one film. For example, as shown in FIG. 1, the first layer 101 can include one titanium film and one platinum film. When immersed in water, the adsorption of ions to the platinum layer can be used to create forces and actuate the layer by applying a voltage to the layer. Such voltage-controlled electrochemical adsorption for actuation can be characterized as a "surface electrochemical actuator" or SEA. In non-limiting embodiments, the thickness of the first layer 101 and/or each film can range from about 1 nm to about 100 nm, from about 1 nm to about 90 nm, from about 1 nm to about 80 nm, from about 1 nm to about 70 nm, from about 1 nm to about 60 nm, from about 1 nm to about 50 nm, from about 1 nm to about 40 nm, from about 1 nm to about 30 nm, from about 1 nm to about 20 nm, or from about 1 nm to about 10 nm.

In certain embodiments, the second layer 102 can include a mirror material for reflecting light over a broad range of wavelengths. For example, the second layer 102 can include aluminum, silicon, glass, gold, rhodium, and silver, as well as dielectrics including but not limited to silicon dioxide, silicon nitride, aluminum oxide, or a combination thereof. In non-limiting embodiments, the second layer 102 can be coated on the surface of a substrate 105. For example, as shown in FIG. 1A, the second layer 102 can be made from aluminum, encased in a protective layer of glass or silicon. In non-limiting embodiments, the thickness of the second layer can range from about 100 nm to about 1000 nm, from about 100 nm to about 900 nm, from about 100 nm to about 800 nm, from about 100 nm to about 700 nm, from about 100 nm to about 600 nm, from about 100 nm to about 500 nm, from about 100 nm to about 400 nm, from about 100 nm to about 300 nm, or from about 100 nm to about 200 nm. In non-limiting embodiments, the thickness of the substrate 105 can range from about 1 μm to about 1 mm, from about 2 μm to about 1 mm, from about 3 μm to about 1 mm, from about 4 μm to about 1 mm, or from about 5 μm to about 1 mm (depending on the intended optical properties of the mirror).

In certain embodiments, the first layer 101 and the second layer 102 can be coupled through at least one metal 103. In non-limiting embodiments, the metal 103 can be disposed on the second layer, and the first layer can be connected to the metal 103. In non-limiting embodiments, the metal 103 can include any standard metal in microfabrication, including but not limited to titanium, gold, platinum, tungsten, nickel, iron, palladium, or combinations thereof. In some embodiments, the thickness of the metal 103 can range from about 1 nm to 1000 nm.

In certain embodiments, the first layer 101 and the second layer 102 can be separated by a gap 104. The gap 104 between the first layer 101 and the second layer 102 can range from about 10 nm to about 1000 nm, from about 10 nm to about 900 nm, from about 10 nm to about 800 nm, from about 10 nm to about 700 nm, from about 10 nm to about 600 nm, from about 10 nm to about 500 nm, from about 10 nm to about 400 nm, from about 10 nm to about 300 nm, from about 20 nm to about 300 nm, from about 30 nm to about 300 nm, from about 40 nm to about 300 nm, from about 50 nm to about 300 nm, or from about 100 nm to about 300 nm. In non-limiting embodiments, the gap 104 can form a cavity between the first layer 101 and the second layer 102. In certain embodiments, the cavity 104 can be filled with any conductive aqueous solution. For example, the cavity can be filled with sodium chloride, potassium chloride, sodium hydroxide, potassium hydroxide, hydrochloric acid, water, or a combination thereof. In non-limiting embodiments, the cavity 104 can be surrounded by the same solution.

In certain embodiments, the disclosed device can include the two-metal film/layer configuration, forming an optical resonator 106. The optical resonator 106 can reflect light at predetermined wavelengths by adjusting the thickness of the gap between the two mirrors. For example, when light is transmitted through the first layer 101, it can then reflect off the bottom mirror 102 and strike the top a second time, where it can be again split. This process can repeat multiple times. The overall light that returns from the cavity 104 can be made of these multiple reflections plus the initially reflected beam. Since each beam has traveled a different total optical path, crossing the gap 104 a different number of times, interference can result. For example, wavelengths that are full integer multiples of the cavity distance (e.g., round trip cavity distance) can yield constructive interference, while wavelengths that are half integer multiples destructively interfere and are suppressed.

In certain embodiments, the disclosed device can be configured to selectively reflect a predetermined color. For example, the first layer 101 enables actuation, allowing a user to dynamically tune the gap and thus the spectral reflectance. For certain combinations of layers and gap heights, only a single constructive interference mode can exist within the visible spectrum of light, meaning the reflectance from the device can be dominated by a single wavelength. The first layer 101 can be electrically actuated by applying voltages in water. The applied voltages can lead to the adsorption of ions from the water, which can cause the first layer 101 (e.g., platinum) to expand.

In certain embodiments, the edges of the first layer 101 can be clamped. For example, the edges of the first layer 101 (e.g., platinum membrane) can be clamped by the disclosed metal 103, which upon expansion of the platinum, causes the structure (e.g., the first layer 101) to buckle. The metal frame 103 can stay bound in place. The height of the buckled membrane 105 can be tuned by increasing or decreasing its potential over the electrolyte (e.g., by making the platinum expand more or less). In non-limiting embodiments, by adjusting the thickness of the first layer 101 or film, the buckling can be tuned to create structures with sizes that span the visible spectrum of light so that the filter can selectively be tuned to reflect any color humans can see.

The disclosed device can form arrays of individually addressable microscale optical resonators 106 that each reflect light at voltage-tunable wavelengths. In non-limiting embodiments, the disclosed optical resonators 106 can be used like pixels, creating spatial patterns with specific colors in specific places.

In certain embodiments, the pixels built using the disclosed techniques can be made microsize (e.g., 1-100 microns), well below the resolution limit of human vision. This enables both improved resolution displays as well as other exotic applications like diffractive optical elements or holography. In non-limiting embodiments, each pixel can operate at voltages compatible with silicon microelectronics (e.g., ~1V) and switch at speeds upwards of 100 ms, enabling video rate applications and simple integration with monolithically fabricated electronics.

The presently disclosed subject matter further provides methods of using the disclosed devices. An example method can include transmitting light through the disclosed first layer 101, reflecting the light using the disclosed second layer 102, resonating the light in the disclosed gap 104, and outputting the light at a predetermined wavelength. The first layer 101 can include a partially reflective membrane 105 (e.g., platinum film), and the first layer 101 and the second layer 102 can be separated by a gap ranging from about 10 nm to about 1000 nm in size.

In certain embodiments, the method can include tuning the amplitude and phase of the light by tuning the size of the gap 104. For example, the size of the gap 104 can be tuned by electronically actuating the first layer 101.

In certain embodiments, the method can include adjusting the thickness of the first layer 101. For example, the thickness can be adjusted by using a variety of semiconductor fabrication techniques (e.g., atomic layer deposition where the layer can be controlled with atomic precision by increasing or decreasing the number of deposition cycles). The thickness of the first layer 101 can range from about 1 nm to about 50 nm.

In certain embodiments, the method can include forming at least one disclosed pixel using the first layer 101 and the second layer 102.

The presently disclosed subject matter further provides methods of fabricating the disclosed devices. The disclosed device can be fabricated using semiconductor fabrication techniques. For example, the first layer 101 (e.g., platinum layer) can be formed via atomic layer deposition, while other metal layers are produced with a range of film deposition techniques (e.g., sputtering, PECVD). All layers can be patterned in parallel with fully lithographic techniques. This allows making large numbers of pixels over large areas, as well as making individual pixels with the disclosed small size. For instance, the disclosed devices can be built down to individual microns, enabling nearly 10,000 such pixels to fit within the smallest space resolvable to the naked eye.

The disclosed subject matter provides voltage-controllable optical micro-resonators that can reflect light at voltage-tunable wavelengths. In non-limiting embodiments, the disclosed optical resonators 106 can be used like pixels, creating spatial patterns with specific colors in specific places. The disclosed device can operate by reflecting light, minimizing power consumption and making them useful for displays that operate outdoors. Each pixel in the surface can be individually addressable using voltage scales comparable to silicon microelectronics, giving a unique path to manufacturable, low-power, reflective color displays

EXAMPLES

Example 1: Voltage Controllable Optical Micro-Resonators for Reflective Displays and Adaptive Optics The disclosed subject matter provides arrays of individually addressable microscale optical resonators 106 that each reflect light at voltage-tunable wavelengths.

An example device structure is depicted in FIGS. 1A and 1B as a schematic. As shown in FIG. 1A, each device has a cavity between two thin films of metal. A bottom layer 102 is essentially a mirror, reflecting light over a broad range of wavelengths. This layer can be made from aluminum, a standard mirror material encased in a thin protective layer of glass or silicon. The top layer 101 of the cavity is a thin film of platinum (on the order of 10 nm thick). The two layers are separated by a thin gap, typically filled with water, roughly 100-300 nm in size. This top layer 101 is sufficiently thin that it is only partially reflective: a fixed fraction of light that strikes this surface passes through while the rest is reflected, depending on the exact thickness of the film.

The disclosed two-metal film configuration, with one partially reflecting, forms an optical resonator 106, which reflects strongly at specific wavelengths set by the thickness of the gap 104 between the first layer 101 and second layer 102. For example, as shown in FIG. 1B, when light is transmitted through the first film 101 (e.g., a partially reflective platinum membrane that is membrane sufficiently thin (~nm) to partially reflect light), it can then reflect off the bottom mirror 102 and strike the top 101 a second time, where it is again split. This process repeats multiple times. The overall light that returns from the cavity 104 is made of these multiple reflections plus the initially reflected beam. Since each beam has traveled a different total optical path, crossing the gap a different number of times, interference results. Wavelengths that are full integer multiples of the cavity distance (e.g., forward and return trip) yield constructive interference, while wavelengths that are half integer multiples destructively interfere and are suppressed.

Figure 2:
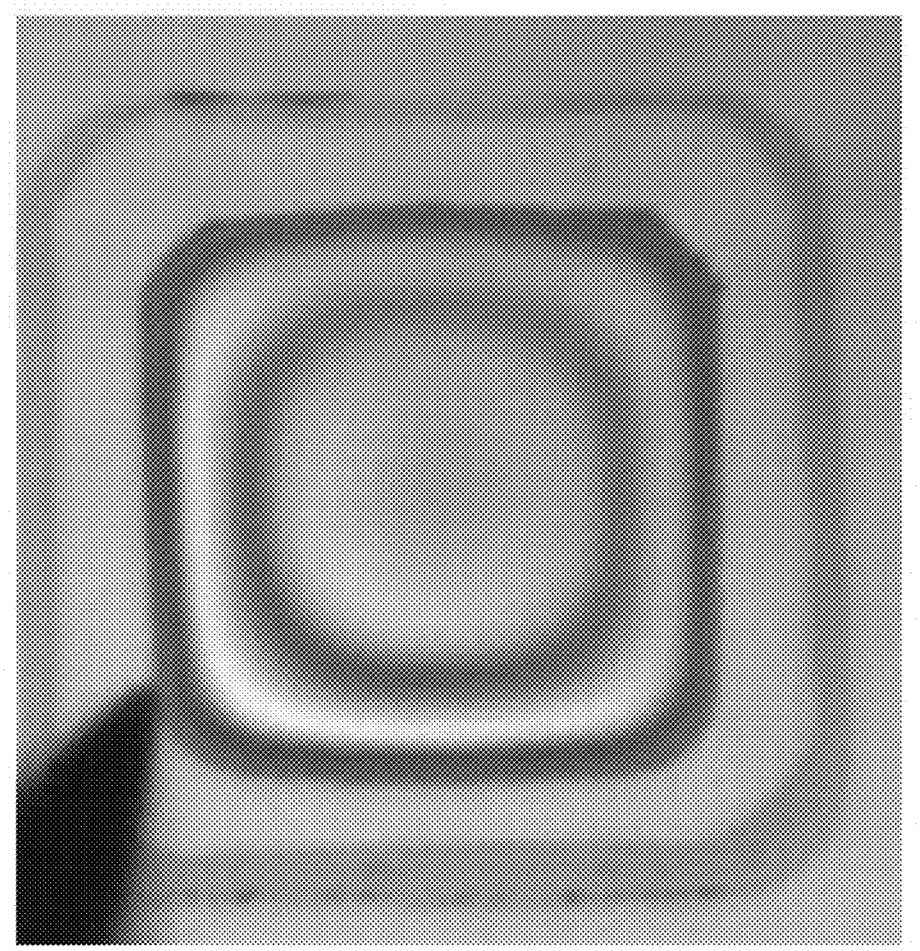
FIG. 2 shows a filtered optical micrograph of a resonator structure through a 450 nanometer bandpass filter.

An example interferogram is shown in FIG. 2. The interferogram was recorded using light having a wavelength of 475 nm. Dark and light bands correspond to contours of height around the upper mirror 101. Whether the band is dark or light depends on whether it represents a destructive or constructive interference node, respectively. The central flat region in the center determines the average color sent back by the reflector.

The top film 101 also plays a second role: it enables actuation, allowing a user to dynamically tune the gap 104 and thus the spectral reflectance. For example, thin layers of platinum can be electrically actuated by applying voltages in water. Applied voltages lead to the adsorption of ions from the water, which causes the platinum to expand. The edges of the platinum membrane can be clamped, which would cause the structure to buckle if it is forced to expand. The height of the deformed membrane 105 can be tuned by increasing or decreasing its potential over the electrolyte (i.e., by making the platinum expand more or less). By properly engineering the platinum thickness, this deformation can be tuned to create structures with sizes that span the visible spectrum of light. The filter can selectively be tuned to reflect any color humans can see.

The disclosed devices 106 can be made using semiconductor fabrication techniques. For example, the platinum is formed via atomic layer deposition while other metal layers are produced with a range of film deposition techniques (e.g., sputtering, PECVD). All layers are patterned massively in parallel with fully lithographic techniques. This allows making large numbers of pixels over large areas, as well as making individual pixels extremely small. For instance, the devices 106 can be built devices down to individual microns, enabling nearly 10,000 such pixels to fit within the smallest space resolvable to the naked eye.

Figure 3:
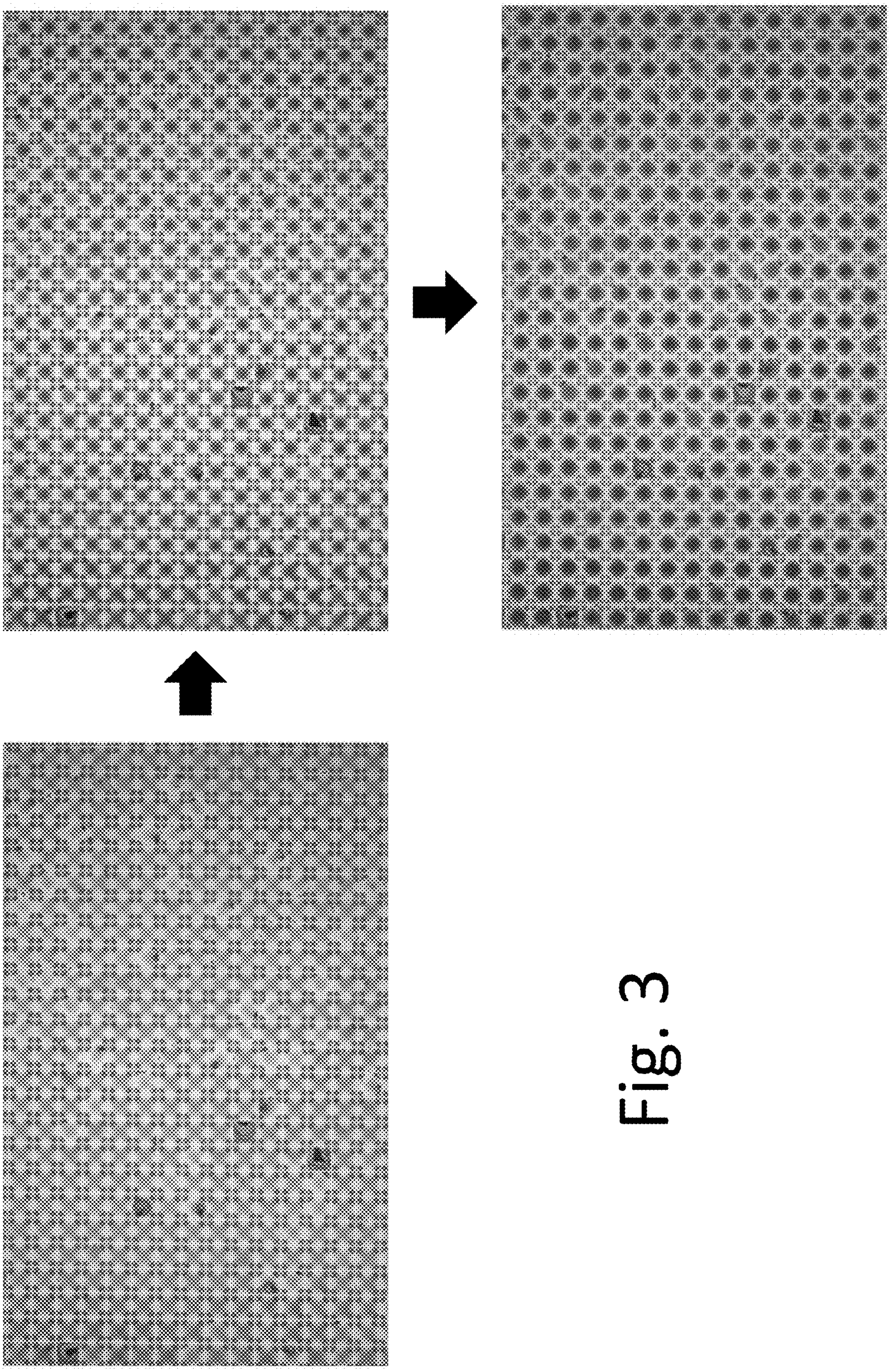
FIG. 3 shows an example array of pixels created using the disclosed subject matter. The collective array is interconnected and changes the reflected color in unison.

FIG. 3 shows example pixels created using the disclosed subject matter. Each pixel is a square shape with holes cut into the corners. In this instance, the holes can be used to increase the rate an actuator can deform by making it easier for fluid to flow into the gap. The micrograph was recorded with a color camera at a variety of voltages applied to the pixels. The color changes in response to the different voltages indicating the ability to selectively reflect specific wavelengths of light.

Figure 4:
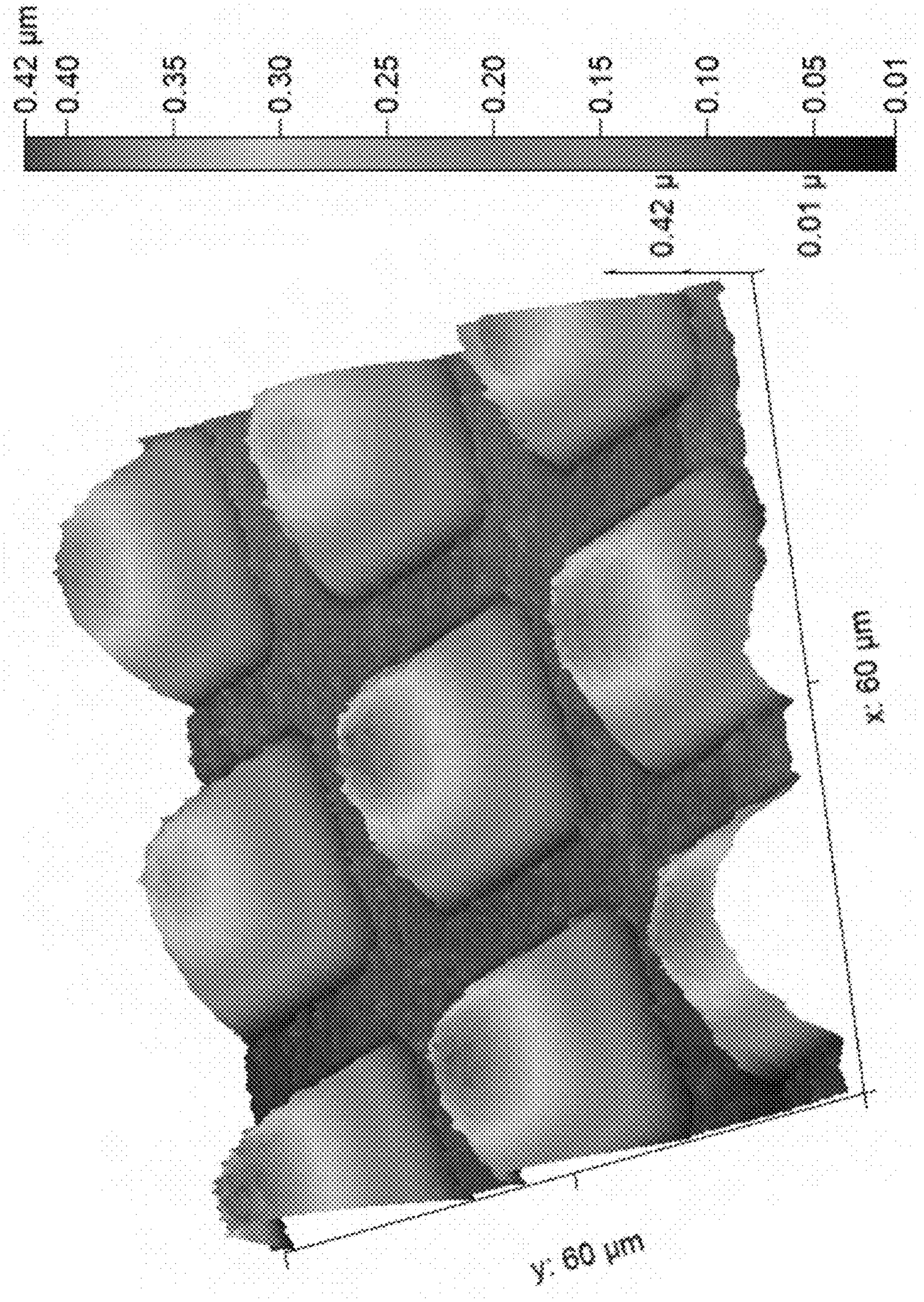
FIG. 4 shows an atomic force micrograph of the surface height profile of the disclosed subject matter showing a partially reflective bump and the interconnecting metal frame in accordance with the disclosed subject matter.

As shown in FIG. 4, each pixel can include two parts: a partially reflective bump 101 and a flat mirror underneath 102. The gap 104 between the two can be a few hundred nanometers, forming an optical resonator 106. FIG. 4 shows an atomic force micrograph of the surface topology of a released pixel in water. FIG. 4 shows a direct measurement of the height contours of a released device. The height of the pixel is here a few hundred nm, indicating the use of this pixel as an optical resonator 106 in the visible spectrum of light.

Figure 5:
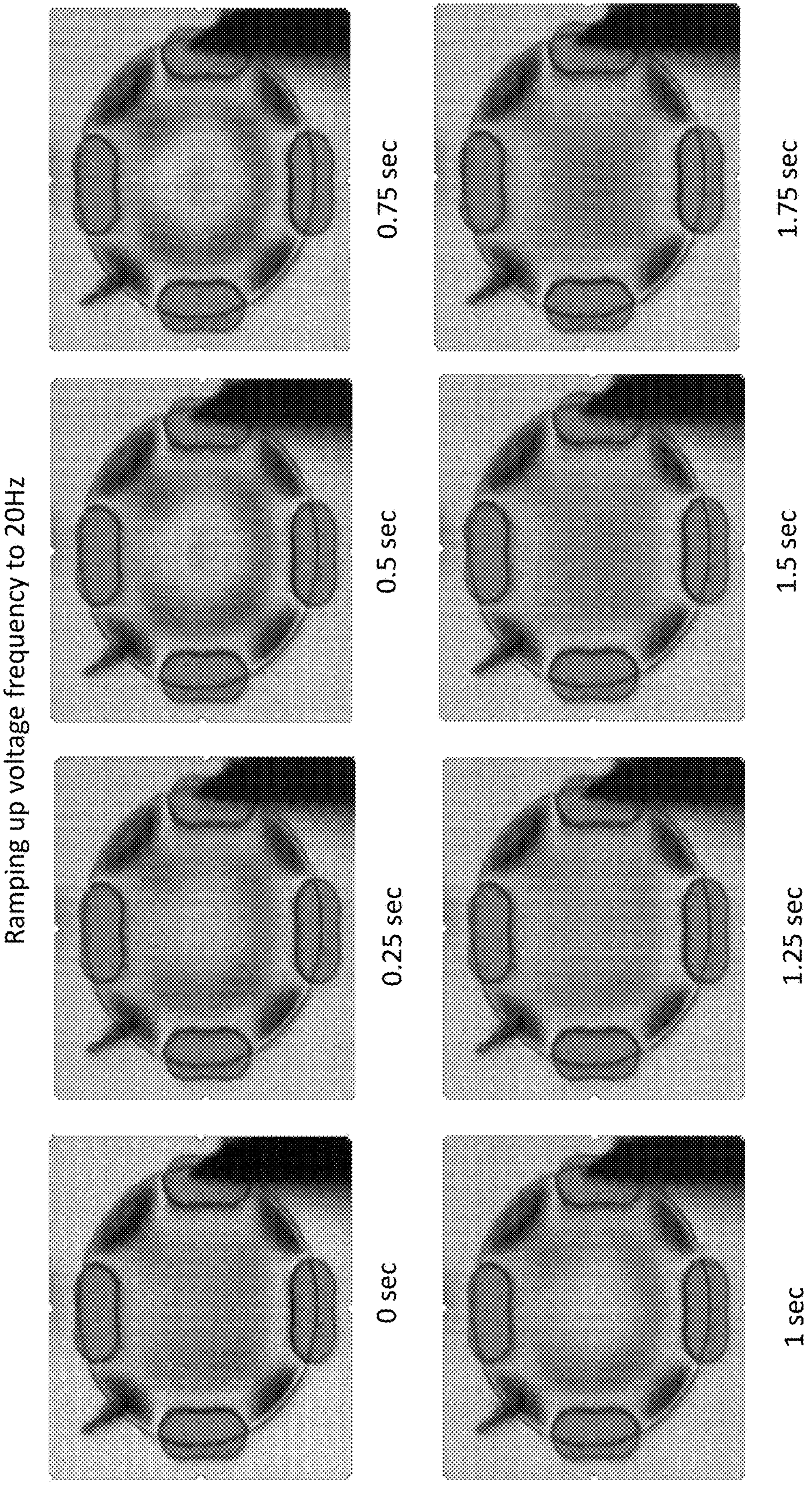
FIG. 5 shows a montage of micrographs characterizing the pixels' response to a sinusoidal voltage applied with frequencies ranging up to 20 Hz.

The disclosed pixels can be driven up to video rate speeds. For example, FIG. 5 shows the operation of the pixels with voltage frequencies up to 20 Hz. Pixels were driven with sinusoidal voltage signals increasing in frequency up to 20 Hz. The pixel responds by changing its interference pattern, indicating the ability to switch states at speeds required for video rate displays.

Figure 6:
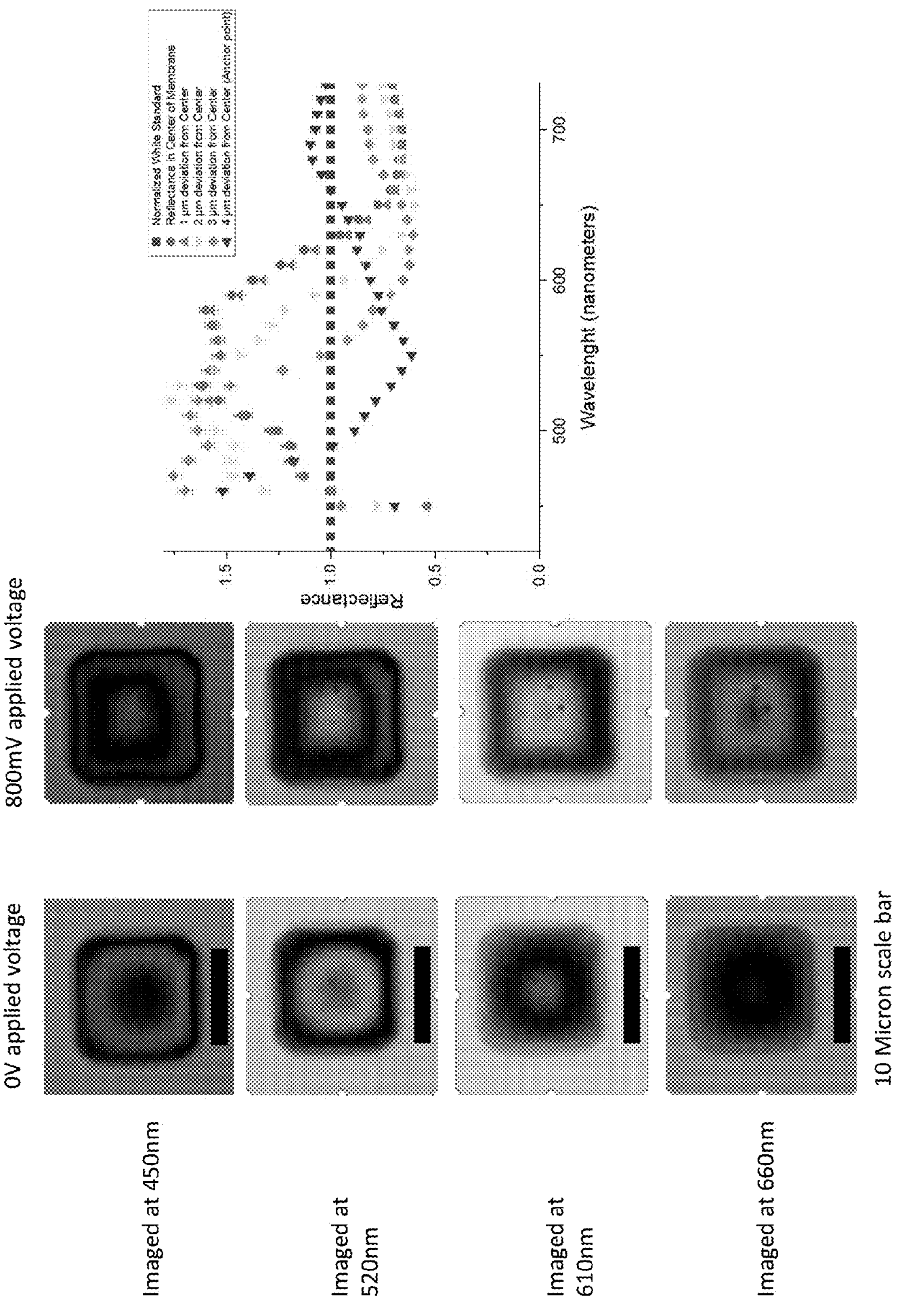
FIG. 6 shows optical micrographs of the pixels viewed at different wavelengths of light and a graph showing the spatially resolved spectral reflectance of the disclosed device.

FIG. 6 shows an optical micrograph of the pixels and a graph showing the spatially resolved reflectance of the disclosed device. As shown in FIG. 6, the pixels can reflect light at predetermined wavelengths. FIG. 6 shows a variety of optical micrographs taken at different wavelengths of light. Each shows a distinct interference pattern related to the structure of the optical resonator 106. This data can be used to spatially resolve the spectral reflectance of the pixel.

Figure 7:
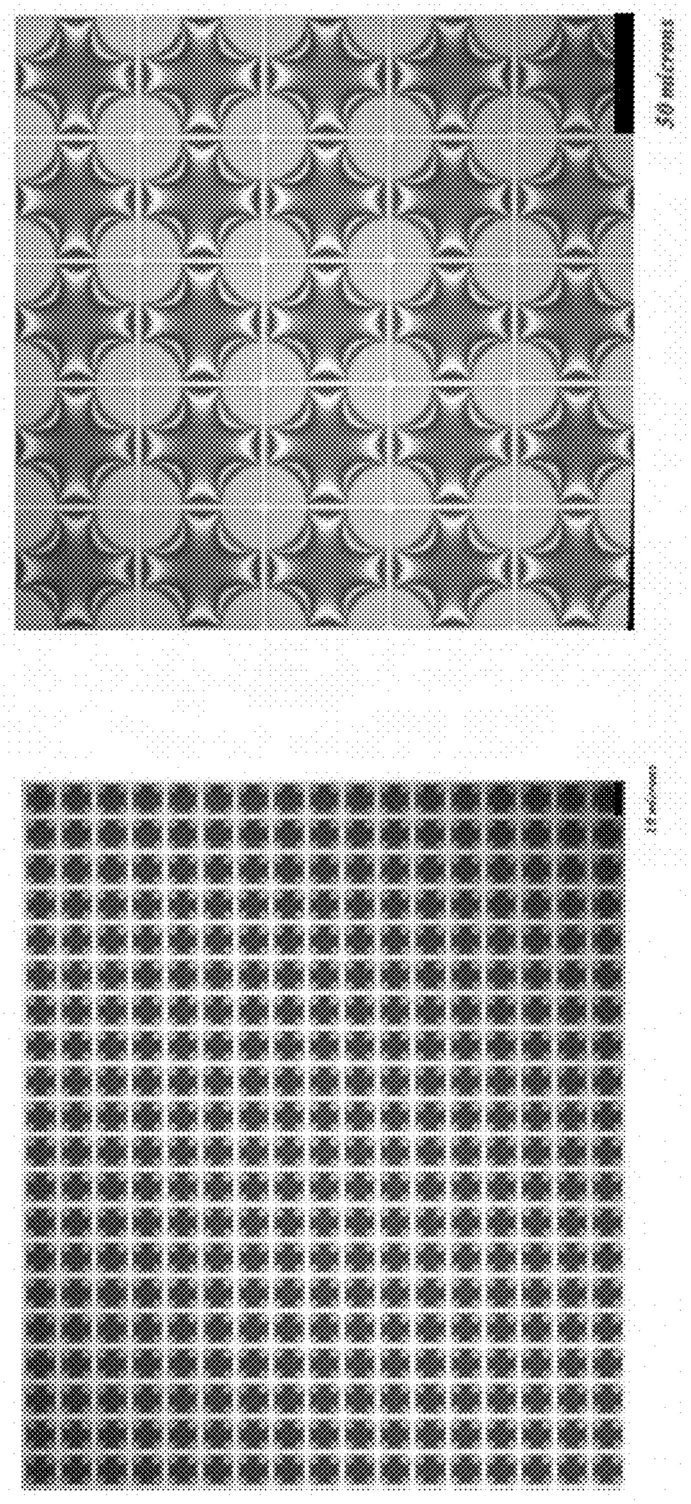
FIG. 7 shows example geometries of the device/pixel that can be formed in accordance with the disclosed subject matter.

The pixels can form various patterns. For example, as shown in FIG. 7, the geometry of the device/pixel can be adjusted. FIG. 7 shows optical micrographs imaged through a 450 nm bandpass filter for a variety of different device geometries. Here the first layer of the resonator 101 has been patterned by removing holes of materials around the corners of a square to increase the response rate and alter the pattern of the reflected light.

Figure 8:
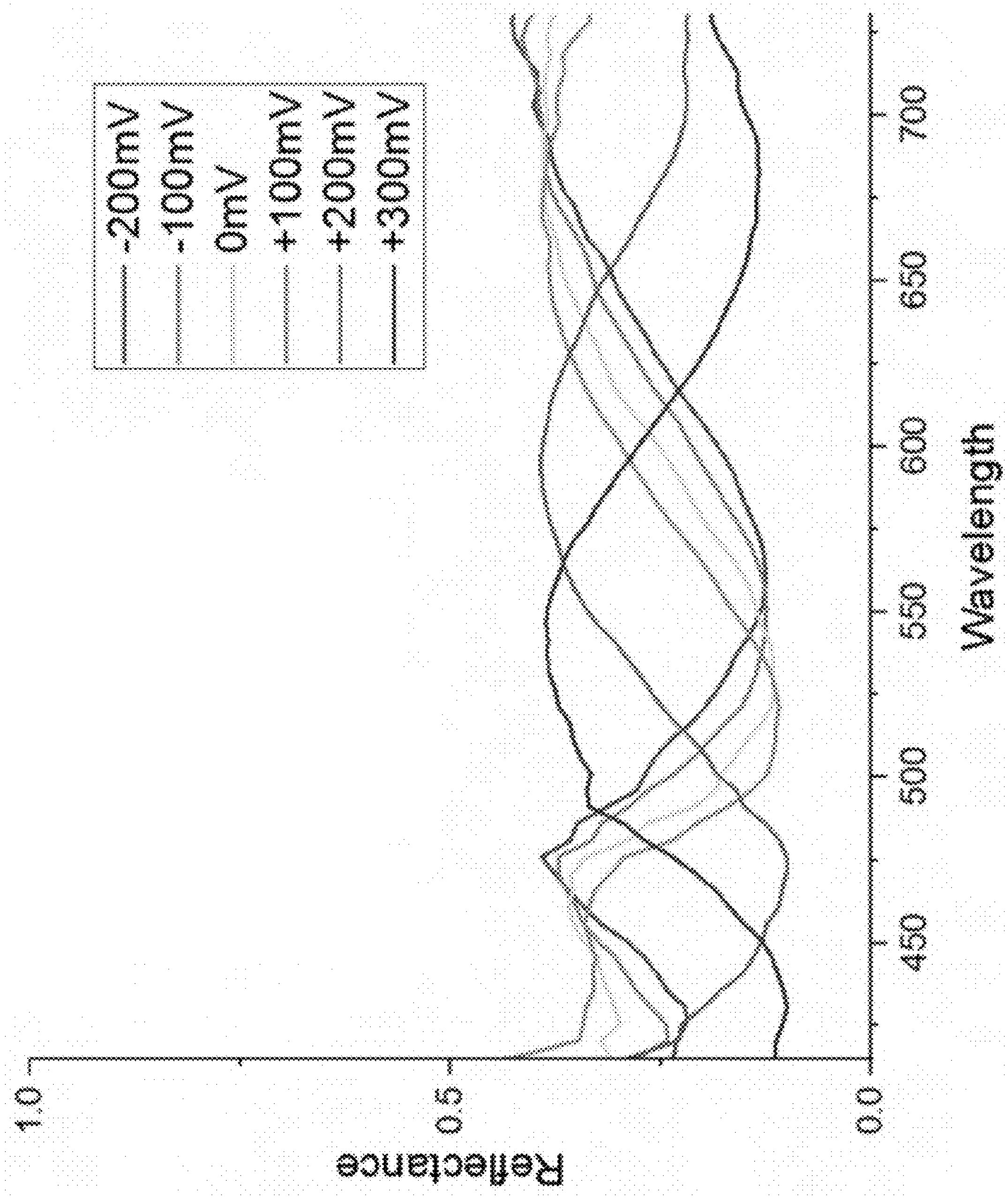
FIG. 8 shows the spectral signatures across the visible light range of the device at a variety of small applied voltages.

Whereas a digital micromirror display can be fast, switching at kilohertz speeds or greater, the pixels can only strictly switch between two binary states of reflectance with no control of phase or spectral response. The disclosed device overcomes the digital micromirror's limitation in binary control of spectral response, as shown in FIG. 8. When the disclosed device experiences an applied voltage within the range of ordinary operation (from −200 mV to +300 mV), the reflectance maxima move across the visible spectrum, with peaks generally moving towards longer wavelenghths. Accordingly, the disclosed device allows continuous control of the phase of reflectance and reflected light by the dynamic tuning of the gap between two metal layers 101 and 102.

Figure 9:
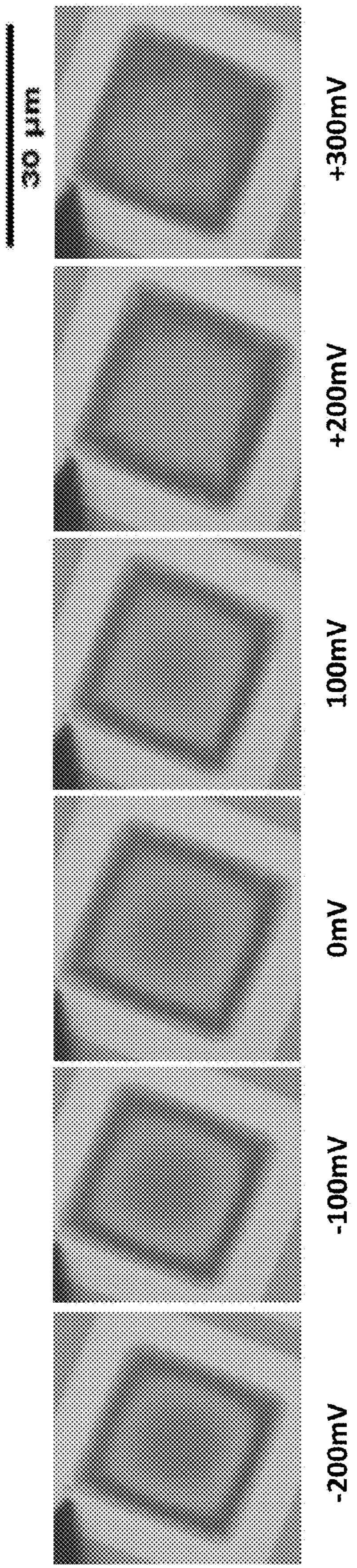
FIG. 9 shows the hyperspectral images of the disclosed device when different voltages in which the disclosed device typically operates are applied.

FIG. 9 shows the hyperspectral images of the disclosed device when different voltages in which the disclosed device typically operates are applied. Bands of different colors correspond to contours of height around the upper mirror. A band's color in the interferogram also provides information as to whether it represents a destructive or constructive interference node, respectively. For instance, two bands of the same color indicate a constructive interference occurs. The flat region in the center determines the average color sent back by the reflector.

Figure 10:
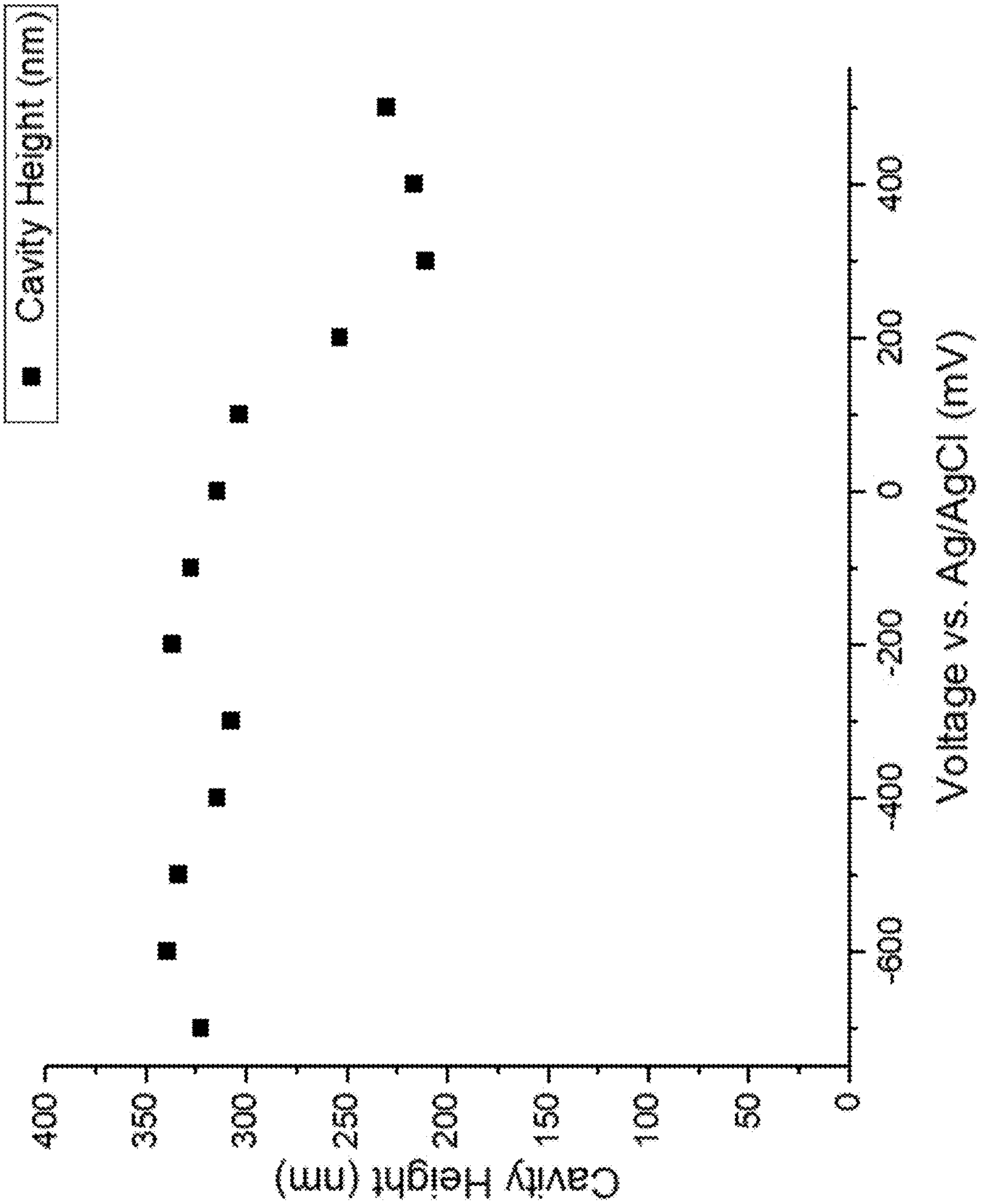
FIG. 10 shows the bump height of the disclosed device at different applied voltages as estimated by fitting reflected spectra to optical models.

FIG. 10 shows the heights of the flat region in the center of gap between the two metal layers 101 and 102 at different voltages within the range of ordinary operation, and provides an illustration of how a user can continuously control the display pixel by applying different voltages to manipulate the size of the gap. For instance, when-200 mV is applied to the disclosed device 106, the gap between the two metal layers is around 350 nm, and according to FIG. 8, the reflectance is the greatest at a wavelength of around 470 nm, which is the wavelength of purple-blue light, as is the color of the center of the disclosed device 106 in FIG. 9 at −200 mV. In contrast, when +300 mV is applied to the disclosed device, the gap between the two metal layers 101 and 102 is around 150 nm, and according to FIG. 8, the reflectance is the greatest at a wavelength of around 550 nm, which is the wavelength of green-blue light, as is the color of the center of the disclosed device in FIG. 9 at +300 mV.

Figure 11:
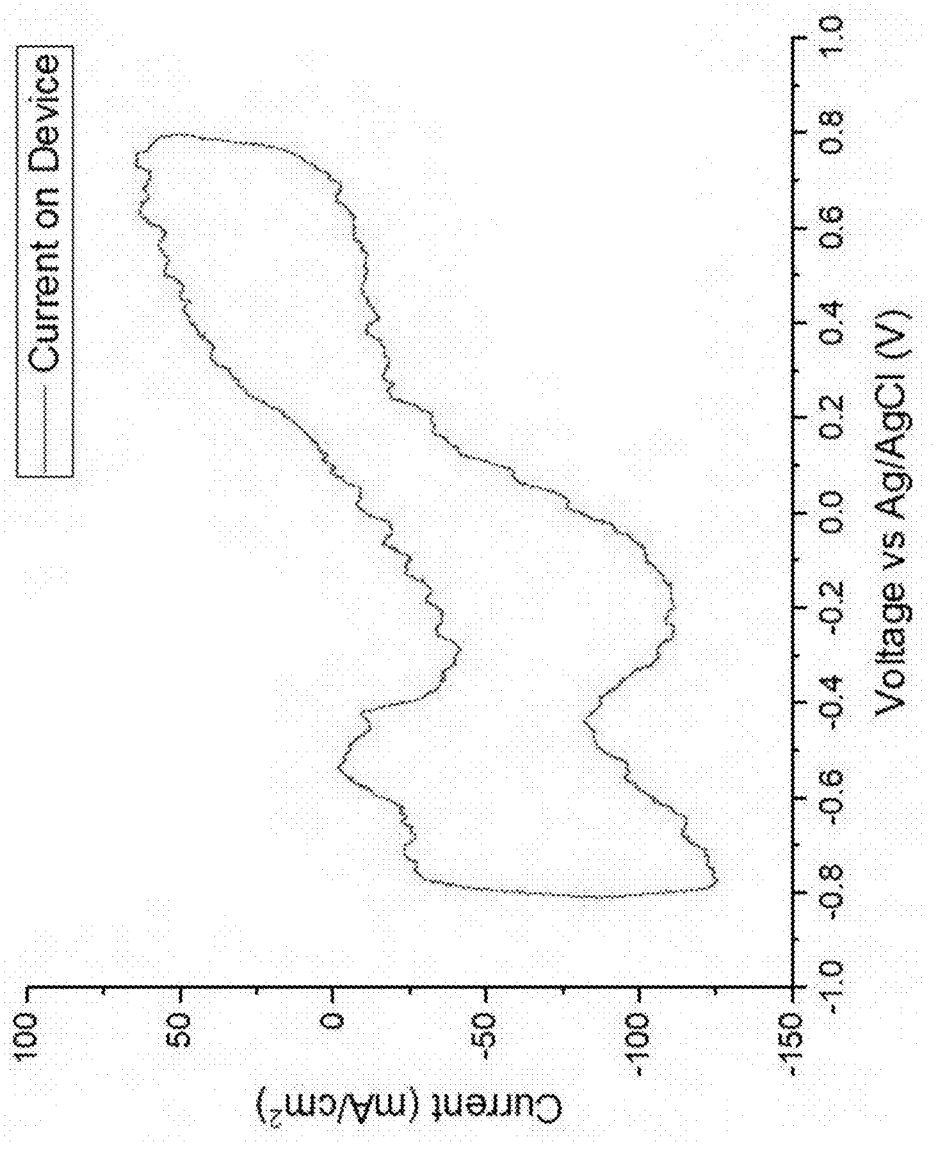
FIG. 11 demonstrates the current-voltage characteristics of the device, which are consistent with platinum electrochemical properties.

FIG. 11 shows the voltage-current electrochemical characteristics of the device, which correspond to well studied platinum electrochemistry, of which our device is mainly composed of. Such data describes the electrical power consumption when changing the pixel state, giving a rough estimate of approximately 10 $mW/cm^2$ of power consumption when the device is switching states.

Figure 12:
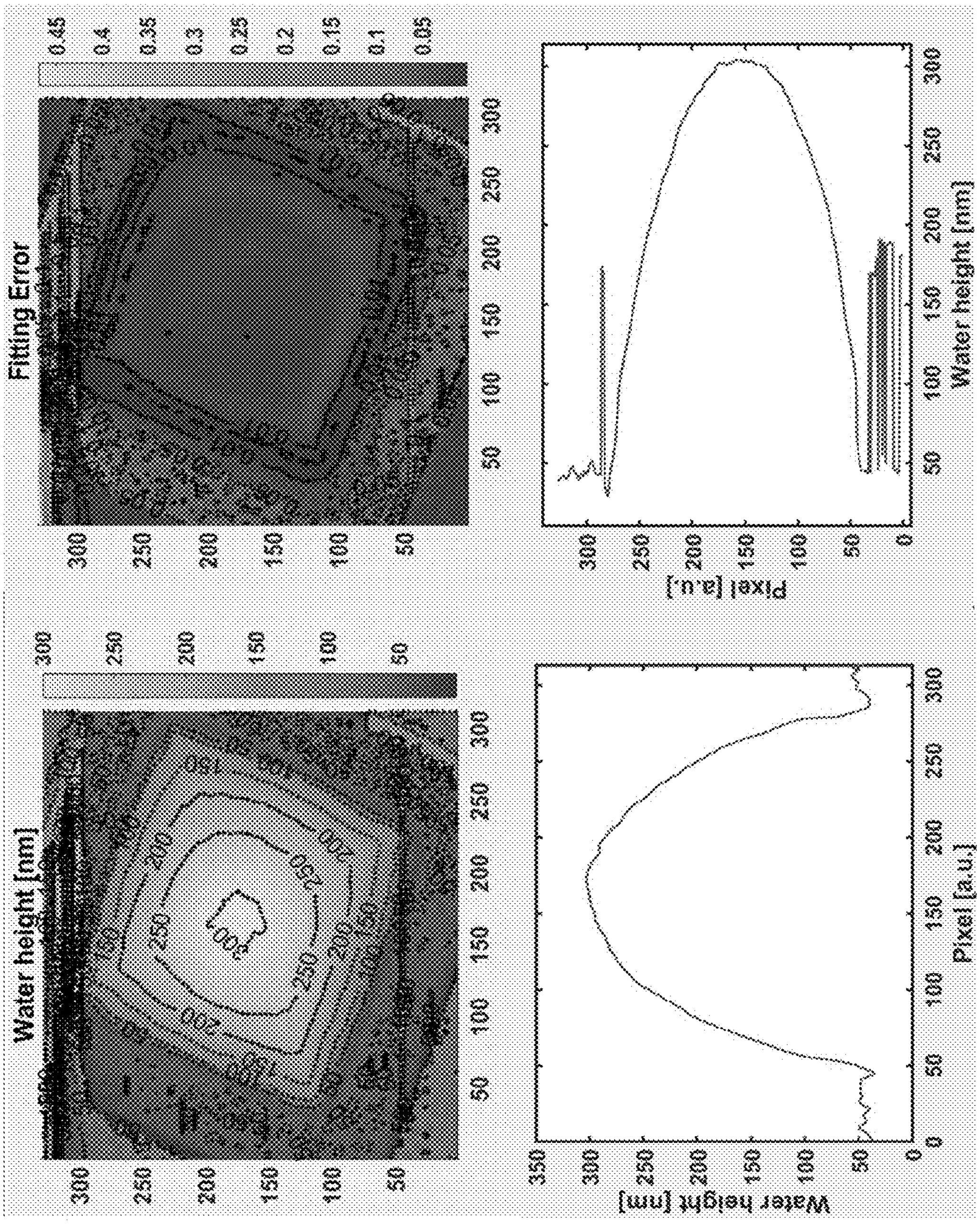
FIG. 12 shows a reconstruction of the pixel geometry, whereby reflectance specta are fit to an optical model to estimate the water height inside of the device cavity as a function of space, along with the horizontal and vertical cross sections of that measurement.

FIG. 12 shows a reconstruction of the deformed platinum layer when a device operating in situ. The estimated shape was generated by fitting an optical model (matrix transfer method) to experimental reflectance data.

Compared to certain reflective displays, such as Liquid Crystal Spatial Light Modulators (LCSM) or Micromirror displays, the disclosed device 106 can provide several advantages. For example, in most existing display technologies, pixel sizes tend to range in the 10-100 microns scale. The fact that the disclosed device can be nearly 10× smaller opens the door to exciting new opportunities like optical holographic displays with large viewing angles (which require micron-scale pixels) or extremely rich color tones (by aggregating multiple reflectors together to engineer the spectrum at a point). Furthermore, LCSLM and micromirrors are strictly phase-control-only and amplitude-only modulation techniques (respectively). By using cavities, the disclosed device can independently tune the amplitude and phase of reflected light, giving unmatched control. While Micromirrors hold an advantage in switching speed (switching at kHz), the disclosed device can outmatch LCSLM devices and can be applied realistically to video rates (e.g., switching at <100 ms). Reflective displays hold significant advantages over active displays, such as microLEDs, since they do not expend the power to create light. This makes them power efficient, especially when used in technologies that need to operate outdoors.

The features of the disclosed device can be unique to this technology and point to promising applications in commercial mobile electronics that are power constrained by displays and/or meant to operate in a wide range of lighting conditions, most notably cell phones and laptops.

The present disclosure is well adapted to attain the ends and advantages mentioned, as well as those that are inherent therein. The particular embodiments disclosed above are illustrative only, as the present disclosure can be modified and practiced in different but equivalent manners apparent to those skilled in the art having the benefit of the teachings herein. Furthermore, no limitations are intended to the details of construction or design herein shown other than as described in the claims below. It is, therefore, evident that the particular illustrative embodiments disclosed above can be altered or modified, and all such variations are considered within the scope and spirit of the present disclosure.

The invention claimed is:

1. A reflective display device comprising:
- a first layer comprising a partially reflective membrane;
- a second layer for reflecting light; and
- at least one metal disposed on the second layer, wherein the first layer is coupled to the at least one metal, wherein the first layer and the second layer are separated by a gap ranging from about 10 nm to about 1000 nm in size, wherein the gap is filled with a conductive aqueous solution, and wherein the first layer is configured to be electrically actuated by applying a voltage to the conductive aqueous solution, adsorb ions from the conductive aqueous solution onto the partially reflective membrane, and expand upon such adsorption.

2. The device of claim 1, wherein the partially reflective membrane is configured such that a predetermined fraction of light is passed when light strikes a surface of the first layer.

3. The device of claim 1, wherein the second layer comprises aluminum, silicon, glass, gold, rhodium, silver, silicon dioxide, silicon nitride, aluminum oxide, or a combination thereof.

4. The device of claim 1, wherein a thickness of the second layer ranges from about 100 nm to about 1000 nm.

5. The device of claim 1, wherein the conductive aqueous solution comprises sodium chloride, potassium chloride, sodium hydroxide, potassium hydroxide, hydrochloric acid, water, or a combination thereof.

6. The device of claim 1, wherein the adsorption causes the partially reflective membrane to expand.

7. The device of claim 1, wherein the partially reflective membrane comprises a film of platinum, a film of titanium, or a combination thereof.

8. The device of claim 7, wherein a thickness of the film ranges from about 1 nm to about 50 nm.

9. The device of claim 1, wherein one or more edges of the first layer are clamped for buckling thereof.

10. The device of claim 9, wherein a height of the buckling is configured to be tuned by adjusting an applied voltage.

11. The device of claim 1, wherein a thickness of the gap ranges from about 100 nm to about 300 nm.

12. The device of claim 11, wherein the device is configured to reflect light at predetermined wavelengths corresponding to the thickness of the gap.

13. The device of claim 1, configured to be a pixel.

14. The device of claim 13, wherein a size of the pixel ranges from about 1 micron to about 100 microns.

15. A method for modifying light for display, comprising:

transmitting at least a portion of the light through a first layer comprising a partially reflective membrane;

reflecting the transmitted light using a second layer, wherein the first layer and the second layer are separated by a gap ranging from about 10 nm to about 1000 nm in size;

resonating the reflected light in the gap, wherein the gap is filled with a conductive aqueous solution;

outputting the resonated light at a predetermined wavelength; and electrically actuating the first layer by applying a voltage to the conductive aqueous solution, adsorbing ions from the conductive aqueous solution onto the partially reflective membrane, and expanding the partially reflective membrane.

16. The method of claim 15, further comprising adjusting a thickness of the first layer, wherein the thickness of the first layer ranges from about 1 nm to about 10 nm.

17. The method of claim 15, further comprising forming at least one pixel using the first layer and the second layer.

18. The method of claim 15, wherein the conductive aqueous solution comprises sodium chloride, potassium chloride, sodium hydroxide, potassium hydroxide, hydrochloric acid, water, or a combination thereof.

19. The method of claim 15, further comprising changing an amplitude and a phase of the resonating light by tuning the size of the gap.

20. The method of claim 19, wherein the size of the gap is tuned by electronically actuating the first layer.

* * * * *